United States Patent
Hedouin

(10) Patent No.: US 7,247,283 B2
(45) Date of Patent: Jul. 24, 2007

(54) METHOD OF PREPARING A TITANIUM AND ZIRCONIUM-BASED OXIDE, THE OXIDES THUS OBTAINED AND THE USE OF SAME AS CATALYSTS

(75) Inventor: Catherine Hedouin, Gouvieux (FR)

(73) Assignee: Rhodia Electronics and Catalysis, La Rochelle (FR)

( * ) Notice: Subject to any disclaimer, the term of this patent is extended or adjusted under 35 U.S.C. 154(b) by 254 days.

(21) Appl. No.: 10/498,305

(22) PCT Filed: Dec. 11, 2002

(86) PCT No.: PCT/FR02/04288

§ 371 (c)(1),
(2), (4) Date: Oct. 12, 2004

(87) PCT Pub. No.: WO03/050042

PCT Pub. Date: Jun. 19, 2003

(65) Prior Publication Data

US 2005/0031532 A1    Feb. 10, 2005

(30) Foreign Application Priority Data

Dec. 12, 2001  (FR) .................................. 01 16039

(51) Int. Cl.
*C01G 1/00*     (2006.01)
*C01G 23/00*    (2006.01)
*C01G 25/00*    (2006.01)

(52) U.S. Cl. ........................... 423/69; 423/71; 423/85; 423/594.12; 423/598

(58) Field of Classification Search ................ 423/598, 423/594.12, 213.2, 69, 71, 85; 502/349
See application file for complete search history.

(56) References Cited

U.S. PATENT DOCUMENTS

| 5,804,152 A | * | 9/1998 | Miyoshi et al. ........... 423/213.5 |
| 2002/0081255 A1 | * | 6/2002 | Cutler et al. .............. 423/213.5 |

FOREIGN PATENT DOCUMENTS

| DE | 27 12 909 A1 | * | 10/1977 |
| EP | 0 370 523 |  | 5/1990 |
| EP | 1 036 767 |  | 9/2000 |
| JP | 6-304477 A | * | 11/1994 |

OTHER PUBLICATIONS

International Search Report.

* cited by examiner

*Primary Examiner*—Timothy C. Vanoy

(57) ABSTRACT

The invention concerns a process for preparing an oxide based on zirconium and titanium in which a liquid medium containing a zirconium compound and a titanium compound is formed; said medium is then heated; the precipitate obtained from the end of the preceding step is recovered and optionally, said precipitate is calcined. The invention also concerns an oxide based on zirconium and titanium. Said oxide can comprise in the range 30% to 40% by weight of titanium oxide and in this case it has a pure $ZrTiO_4$ type structure or a mixture of phases of structure type $ZrTiO_4$ and structure type anatase. Said oxide can also comprise in the range 10% to 20% by weight of titanium oxide and it then has a specific surface area of at least 40 $m^2$/g after calcining for 5 hours at 800° C.

3 Claims, No Drawings

METHOD OF PREPARING A TITANIUM AND ZIRCONIUM-BASED OXIDE, THE OXIDES THUS OBTAINED AND THE USE OF SAME AS CATALYSTS

This application is an application under 35 U.S.C. Section 371 of International Application Number PCT/FR02/04288 filed on Dec. 11, 2002.

The present invention relates to a process for preparing an oxide based on zirconium and titanium, to oxides based on zirconium and titanium obtained thereby, and to the use of said oxides as catalysts.

It is known that oxides based on zirconium and titanium can be used as a catalyst or catalyst support. However, known processes for preparing them result in products with an unstable specific surface area. This is substantially reduced when the products are subjected to high temperatures, for example over 600° C., and they can reach values which render those products unsuitable for high temperature use as a catalyst support.

One aim of the invention is to develop a process which produces oxides based on zirconium and titanium with a specific surface area that remains high even after calcining at high temperatures.

To this end, the process of the invention for preparing an oxide based on zirconium and titanium is characterized in that it comprises the following steps:

forming a liquid medium containing a zirconium compound and a titanium compound;

heating said medium;

recovering the precipitate obtained at the end of the preceding step;

optionally, calcining said precipitate.

Further, the invention concerns, as novel products and in accordance with a first implementation, an oxide based on zirconium and titanium which is characterized in that it comprises 30% to 40% by weight of an oxide of titanium and in that it has a $ZrTiO_4$ type structure, pure or as a mixture of phases with structure type $ZrTiO_4$ and with an anatase type structure.

In a second implementation, the invention also concerns an oxide based on zirconium and titanium which is characterized in that it comprises 10% to 20% by weight of titanium oxide and in that it has a specific surface area of at least 40 m²/g after calcining for 5 hours at 800° C.

Further characteristics, details and advantages of the invention will become clearer from the following description and non limiting examples which are given by way of illustration.

It should be noted that throughout the description, the term "specific surface area" means the BET specific surface area determined by nitrogen adsorption in accordance with the ASTM D 3663-78 standard established from the BRUNAUER-EMMETT-TELLER method described in the periodical "The Journal of the American Chemical Society", 60, 309 (1938).

The first step of the process of the invention consists of preparing a mixture of a zirconium compound and a titanium compound in a liquid medium.

The liquid medium is generally water.

The compounds are preferably soluble compounds. In particular, they can be salts of zirconium and of titanium.

The mixture can equally be obtained either from compounds initially in the solid state which are subsequently introduced into a stock, for example water, or directly from solutions of said compounds and subsequent mixing, in any order, of said solutions.

The zirconium compounds can be selected from zirconyl sulphate, zirconyl nitrate, zirconium nitrate or zirconyl chloride. Zirconyl nitrate is particularly suitable.

More particularly, the titanium compound can be titanium oxychloride. Titanyl sulphate, titanium nitrate and titanium tetrachloride can also be mentioned.

Once the initial mixture has been obtained, it is heated in accordance with the second step of the process of the invention.

The temperature at which said heat treatment is carried out, also known as thermohydrolysis, is preferably over 100° C. It can thus be in the range 100° C. to the critical temperature of the reaction medium, in particular between 100° C. and 350° C., and preferably between 100° C. and 200° C.

The heating operation can be carried out by introducing the liquid medium containing said species into a closed vessel (closed autoclave type reactor), the necessary pressure then resulting only from heating the reaction medium (autogenous pressure). Under the temperature conditions given above, and in aqueous media, it can be stated by way of illustration that the pressure in the closed reactor can be between a value of over 1 bar ($10^5$ Pa) and 165 bars ($1.65 \times 10^7$ Pa), preferably between 3 bars ($5 \times 10^5$ Pa) and 10 bars ($1.65 \times 10^7$ Pa). Clearly, it i also possible to exert an external pressure which then adds to that consequent upon heating.

Heating can also be carried out in an open reactor for temperatures close to 100° C.

Heating can be carried out either in air or in an atmosphere of an inert gas, preferably nitrogen.

The treatment period is not critical and can vary within wide limits, for example between 1 and 48 hours, preferably between 2 and 24 hours. Similarly, the rate of temperature rise is not critical, and the fixed reaction temperature can be reached by heating the medium for between 30 minutes and 4 hours, for example, these values being given by way of indication alone.

At the end of this second step and in a particular variation of the invention, it is possible to bring the reaction medium obtained to a basic pH. This variation can result in products with greater chemical purity.

This operation is carried out by adding to the medium a base such as an ammonia solution, for example.

The term "basic pH" means a pH of more than 7 and preferably more than 8.

After the heating step, a solid precipitate is recovered which can be separated from its medium using any conventional technique for solid-liquid separation, such as filtration, decanting, draining or centrifuging.

The recovered product can then be washed using water or, optionally, a basic solution, for example an ammonia solution. To eliminate residual water, the washed product can finally and optionally be dried, for example in an oven or by spray drying, at a temperature which can be between 80° C. and 300° C., preferably between 100° C. and 200° C.

In a particular implementation of the invention, a specific type of washing can be employed, consisting of taking up the separated product in suspension in water and adjusting the pH of that suspension to a value of more than 7 and preferably more than 8 by adding a base, for example. After separating again, the product can be recovered for the subsequent step or for a further wash of the same type.

In a final step of the process of the invention, after any washing and/or drying, the recovered precipitate can then be calcined if necessary. Said calcining can develop the crystallinity of the product formed and produce it essentially in the oxide form, and it can also be adjusted and/or separated as a function of the subsequent service temperature of the oxide of the invention, taking into consideration the fact that the higher the calcining temperature, the lower the specific surface area of the product. Calcining is generally carried out in air but clearly, calcining carried out in an inert gas is not excluded.

In a particular variation of the invention, calcining can be carried out in a confined atmosphere. This variation can result in products with a higher surface area.

In practice, the calcining temperature is generally limited to an interval in the range 300° C. to 1000° C.

The invention also concerns certain oxides based on zirconium and titanium which will now be described.

In the present description, the proportions of oxides are given as the weight of titanium oxide over the composition as a whole, i.e. $TiO_2/(ZrO_2+TiO_2)$.

The products in accordance with the first implementation of the invention comprise in the range 30% to 40% by weight of titanium oxide. They can also have a pure $ZrTiO_4$ type structure. The term "pure" means that X ray diffraction analysis of the product does not reveal any structure other than the $ZrTiO_4$ structure. This structure corresponds to reference 34-415 JCPDS.

The products can also be in the form of a mixture of phases of structure type $ZrTiO_4$ and of structure type anatase $TiO_2$. However, structure type $ZrTiO_4$ is in the majority. The anatase $TiO_2$ structure type is shifted very substantially towards large interplanar spacings, probably due to insertion of $Zr^{4+}$ ions into the anatase structure. The presence of two structures corresponds to products with the highest titanium oxide contents, in particular to a content of 40%.

Finally, the products in this first variation have a specific surface area of at least 30 $m^2/g$ after calcining for 5 hours at 800° C. More particularly, this specific surface area can be at least 35 $m^2/g$ and still more particularly at least 40 $m^2/g$.

The products in the second implementation of the invention comprise between 10% and 20% by weight of titanium oxide. Further, they have a specific surface area of at least 40 $m^2/g$ after calcining for 5 hours at 800° C.

They are generally in the form of a mixture of two structures, namely a tetragonal $ZrO_2$ type structure and a monoclinic $ZrO_2$ structure. The tetragonal type structure corresponds to a structure with reference 79-1771 JCPDS. The monoclinic type structure (baddeleyite) corresponds to a structure with reference 37-1484 JCPDS. The proportions of these two structures vary depending on the titanium oxide content. For the highest titanium contents, i.e. 20% or very close to 20%, the tetragonal zirconia type structure is in the majority. It is also observed that the structures are shifted very substantially towards small interplanar spacings, probably due to insertion of $Ti^{4+}$ ions into the zirconia structure. In contrast, for the lowest titanium contents, i.e. closest to 10% and in particular 10%, the monoclinic type zirconia structure is in the majority and it has been observed that this is shifted substantially towards small interplanar spacings, also probably due to insertion of $Ti^{4+}$ ions into the zirconia structure.

The oxides forming the basis of the invention as described above or as obtained from the process described above are in the form of a powder, but they can also be shaped into granules, beads, cylinders or honeycombs of various dimensions. Said oxides can be applied to any support that is routinely used in the catalysis field, such as $Al_2O_3$ or $SiO_2$. The oxides can also be used in catalytic systems comprising a wash coat based on said oxides, on a substrate that is, for example, a metallic or ceramic monolith. The coating can also comprise a support of the type mentioned above.

Said catalytic systems and more particularly the oxides of the invention or compositions comprising said oxides may have many applications. Thus, they are particularly adapted to catalyzing a variety of reactions such as dehydration, hydrosulphurization, hydrodenitration, desulphurization, hydrodesulphurization, dehydrohalogenation, reforming, steam reforming, cracking, hydrocracking, hydrogenation, dehydrogenation, isomerization, disproportionation, oxychlorination, dehydrocyclization of hydrocarbons or other organic compounds, oxidation and/or reduction reactions, the Claus reaction, the treatment of exhaust gases from internal combustion engines, demetallization, methanation or shift conversion.

In the case of such use in catalysis, the oxides of the invention can be employed in combination with precious metals. The nature of these metals and the techniques for incorporating them into said oxides are well known to the skilled person. As an example, the metals can be platinum, rhodium, palladium, ruthenium or iridium. In particular, they can be incorporated into the oxides by impregnation.

Of the cited uses, the treatment of exhaust gas from internal combustion engines (automobile post combustion catalysis) constitutes a particularly advantageous application.

To this end, the invention also concerns the use of a catalytic composition comprising an oxide as described above or as obtained by the process of the invention to the production of a catalyst for automobile post combustion.

Some examples will now be given.

EXAMPLE 1

This example concerns the synthesis of a $ZrO_2/TiO_2$ oxide, 70%/30% by weight.

The starting materials were as follows:

$ZrO(NO_3)_2$ in solution, with a $ZrO_2$ concentration of 19.40%;

$TiOCl_2$ in solution with a $TiO_2$ concentration of 25.32%;

$NH_4OH$, 20%.

The first step consisted of preparing 750 ml of a 80 g/l solution of $ZrO_2$ and $TiO_2$ oxide. To prepare this solution, 216.49 g of zirconium oxynitrate solution and 71.09 g of titanium oxychloride solution were prepared.

The prepared solution was placed in a PROLABO© autoclave and the temperature was raised to 150° C. The temperature was raised over 75 minutes, followed by a constant temperature stage of 6 hours at 150° C. The pressure in the autoclave was also about 4.5 bars. After cooling, ammonia was added to the suspension to produce a pH of 9. The suspension was then centrifuged. The cake obtained was taken up in suspension in 750 ml of ammonia water (pH=9) then centrifuged again. This operation was repeated four times. The solid obtained was oven dried for 2 hours at 110° C. then calcined in a muffle furnace in a confined atmosphere (temperature ramp-up 1° C./min).

The synthesized oxide had a specific surface area of 42 $m^2/g$ after calcining for 5 h at 800° C. X ray analysis of the product showed that it was in the form of a pure $ZrTiO_4$ type structure.

EXAMPLES 2 TO 4

The procedure of Example 1 was followed, but the proportions of the reactants were varied to obtain oxides with different proportions of zirconium oxide and titanium oxide. The results are shown in the following table.

| Example | Proportions, $ZrO_2/TiO_2$ | Specific surface area | Structures |
|---|---|---|---|
| 2 | 60/40 | 38 $m^2/g$ | Mainly $ZrTiO_4$ + anatase $TiO_2$, shifted very substantially towards large interplanar spacings |
| 3 | 80/20 | 42 $m^2/g$ | Mainly tetragonal $ZrO_2$ with shifts of several peaks + shifted monoclinic $ZrO_2$, the two structures are shifted towards small interplanar spacings |
| 4 | 90/10 | 40 $m^2/g$ | Mainly monoclinic $ZrO_2$, with certain peaks shifted towards small interplanar spacings + tetragonal $ZrO_2$ |

The invention claimed is:

1. A process for preparing an oxide based on zirconium and titanium, comprising the steps of:
   a) forming a liquid medium containing a zirconium compound and a titanium compound, wherein the zirconium compound is zirconyl sulphate, zirconyl nitrate or zirconyl chloride and the titanium compound is titanium oxychloride;
   b) heating said medium to a temperature of more than 100° C. in order to obtain a precipitate;
   c) recovering the precipitate obtained at the end of step b); and optionally, calcining said precipitate.

2. The process according to claim 1, wherein said medium is heated to a temperature of between more than 100° C. and 350° C.

3. The process according to claim 1, wherein the reaction medium obtained at the end of the heating step is brought to a basic pH.

* * * * *